United States Patent [19]

Jacobson

[11] Patent Number: 5,155,071
[45] Date of Patent: Oct. 13, 1992

[54] FLAME-PRODUCED PARTIALLY STABILIZED ZIRCONIA POWDER

[75] Inventor: Howard W. Jacobson, Wilmington, Del.

[73] Assignee: E. I. du Pont de Nemours and Company, Wilmington, Del.

[21] Appl. No.: 623,583

[22] Filed: Aug. 16, 1991

[51] Int. Cl.⁵ .............................................. C04B 35/48
[52] U.S. Cl. .................................... 501/103; 501/104; 423/608
[58] Field of Search .................... 501/103, 104, 105; 423/76, 77, 78, 608, 266

[56] References Cited

U.S. PATENT DOCUMENTS

| | | | |
|---|---|---|---|
| 4,788,045 | 11/1988 | Colombet et al. | 423/85 |
| 4,873,064 | 10/1989 | Kato | 423/85 |
| 4,933,154 | 6/1990 | Kison | 423/69 |
| 4,999,182 | 3/1991 | Baumard et al. | 423/608 |

Primary Examiner—Karl Group
Assistant Examiner—Chris Gallo
Attorney, Agent, or Firm—Caroline J. Yun

[57] ABSTRACT

Partially stabilized cubic or tetragonal zirconia powder are provided which comprise aggregates of dense equiaxial primary particles, wherein said particles have an average diameter of less than about 150 nm and comprise zirconia and a homogeneously distributed stabilizer, as well as processes for their production employing flame combustion of homogeneous mixtures of $ZrCl_4$ and stabilizer precursors.

22 Claims, No Drawings

FLAME-PRODUCED PARTIALLY STABILIZED ZIRCONIA POWDER

BACKGROUND OF THE INVENTION

Partially stabilized zirconia (PSZ) powders are of interest because they are useful in the fabrication of high strength zirconia ceramics which have high fracture toughness and resistance to thermal shock, and are extremely wear resistant. Such materials, which have been described as "ceramic steel" and "toughened ceramics", are useable under extreme conditions, particularly at high temperatures and in the presence of aggressive chemicals, in numerous applications. They are used, e.g., in extrusion and drawing dies, in valve guides and seatings, in tool bits for metal shaping operations such as turning, milling and punching, and in fuel cells.

Zirconium oxide, or zirconia, is a refractory oxide known to exist in three crystalline forms which are interconvertible and which are stable over certain temperature ranges. Up to about 1170° C., the monoclinic habit occurs, between about 1170° C. and 2370° C. the tetragonal habit forms, and from about 2370° C. up to the melting point (about 2680° C.) zirconia is in the cubic form.

Fully stabilized zirconia consists entirely of the cubic crystallite structure and remains in this form over a wide temperature range due to the presence of sufficient amounts of stabilizing oxides, such as, for example, magnesium oxide (magnesia), calcium oxide (calcia), yttrium oxide (yttria) and/or cerium oxide (ceria). These oxides may be present along with zirconia either individually or as mixtures.

In partially stabilized zirconia, the predominant crystalline forms are cubic or tetragonal, the proportions of each being determined by the method of preparation. When the predominant form is tetragonal, some monoclinic form may be present also, but very little cubic. When the zirconia in the PSZ is mainly in the cubic form, the other forms are present only in small amounts. The oxides that are effective as stabilizers in PSZ are the same ones as those used in fully stabilized zirconia, although lesser amounts are used. PSZ can be processed to high strength and toughened ceramics by utilizing the volume expansion and shear strain developed in the tetragonal to monoclinic transition.

There are numerous references in the literature which describe the preparation of PSZ powders and ceramic bodies made from such powders. Several processes have been developed for the preparation of PSZ and most of them employ batch-wise procedures.

A traditional procedure is to mix commercially available monoclinic zirconia powder with stabilizer powders or their precursors and heat the mixture for several hours at 2050° to 2600° F., as described by T. W. Smoot, U.S. Pat. No. 3,301,646 (1967) and K. Yamada et al., U.S. Pat. No. 4,344,904 (1982). Powders produced by this solid state diffusion process do not have a homogeneous distribution of stabilizer and they are often sintered to relatively large agglomerates and aggregates. Size reduction by milling for several hours is necessary to produce powders suitable for ceramic processing. Such milling and classification processes lead to contamination. Powders obtained by the procedures of U.S. Pat. No. 3,301,646 consist of particles in the size range of 0.2 to 12 microns with 90 to 95% falling between 0.5 and 3.5 microns in diameter. In U.S. Pat. No. 4,344,904 there is no specific limitation on particle size although a preference is expressed for particles having a diameter not larger than 10 microns.

R. C. Garvie et al., U.S. Pat. No. 4,279,655 (1981) wet mill mixtures of zirconia and stabilizer powders to obtain a mean particle size of about 0.7 microns. The powders are dried and calcined at 800° to 1450° C. for about 24 hours and again wet milled until the particle size is about 0.7 microns. Although wet milling produces a more homogeneous composition, the process usually leads to contamination.

More uniform distribution of the stabilizer and zirconia can be obtained by co-precipitation of salts of both zirconium and the stabilizer species followed by calcining to form the oxides. The high temperature required to produce the oxides tends to create agglomerates which require a grinding operation to break them down and this can result in contamination. Alternatively a precursor solution of zirconium and a stabilizer can be co-hydrolyzed to form a homogeneous gel. The moisture is removed by a drying process and the resulting powder is calcined and milled. Somewhat lower temperatures, 1000° to 1200° C., can be used to produce PSZ and the particle size is smaller than in the previously described processes. However, some milling is necessary to obtain a powder suitable for processing to ceramic bodies.

Hydrothermal processes, such as those described by E. P. Stambaugh et al., U.S. Pat. No. 4,619,817 (1986) may be used to make PSZ powders with controlled particle size. This procedure uses an aqueous solution of zirconyl nitrate or zirconyl chloride to which a complexing agent, such as EDTA may be added. The pH is brought to 9 or more and MgO, CaO or $Y_2O_3$ are added singly or multiply. Hydrothermal treatment in an autoclave at 190° to 350° C. produces powders having a median particle size in the range of 0.05 to 3.6 micron, typically 0.2 to 0.5 microns.

Each of the prior art compositions and processes suffers from various deficiencies, and further improvements are desirable.

SUMMARY OF THE INVENTION

The properties of toughened zirconia ceramics are enhanced when dense compositions can be made having very fine grain structure free from impurities. Such compositions are obtainable by sintering powders consisting of very small particles and having a homogeneous composition.

Especially advantageous partially stabilized zirconia powders will be composed of very small sized primary particles, which are in turn composed of exceedingly uniformly distributed atoms of Zr and stabilizer atoms in an oxide matrix. For the process of making such powders, it would be most advantageous if it could be conducted in a continuous, rather than batch-wise, manner.

One aspect of the present invention relates to novel partially stabilized cubic or tetragonal zirconia powder, comprising small aggregates of dense equiaxial primary particles, wherein said particles have an average diameter of less than about 150 nm and comprise zirconia and a homogeneously distributed stabilizer.

Another aspect of this invention relates to a method of preparing a partially stabilized cubic or tetragonal zirconia powder, said powder comprising aggregates of dense equiaxial primary particles, wherein said particles have an average diameter of less than about 150 nm and comprise zirconia and homogeneously distributed stabilizer, comprising combusting a homogeneously distributed mixture of (a) zirconia precursor and (b) a stabilizer precursor.

Yet another aspect of this invention relates to a method of preparing a partially stabilized cubic or tetragonal zirconia powder, said powder comprising aggregates of dense equiaxial primary particles, wherein said particles have an average diameter of less than about 150 nm and comprise zirconia and homogeneously distributed stabilizer, comprising a) intimately mixing $ZrCl_4$ powder with a stabilizer precursor powder or a combination of stabilizer precursor powders;
b) vaporizing the volatile components of the powder mixture, $ZrCl_4$;
c) combusting in a flame reactor the components from step b) conveyed to the flame reactor uniformly in an inert gas such as argon;
d) quenching the combustion reaction; and
e) recovering partially stabilized zirconia powder.

A fourth aspect of this invention relates to a partially stabilized cubic or tetragonal zirconia powder, comprising aggregates of dense equiaxial primary particles, wherein said particles have an average diameter of less than about 150 nm and comprise zirconia and a homogeneously distributed stabilizer, produced by a method comprising combusting a homogeneously distributed mixture of (a) a zirconia precursor and (b) a stabilizer precursor.

Upon further study of the specification and appended claims, further objects and advantages of this invention will become apparent to those skilled in the art.

DETAILED DESCRIPTION OF THE INVENTION

This invention thus relates to novel partially stabilized zirconia powders and to processes for their production. The PSZ powders are composed of $ZrO_2$ and stabilizing oxides, for example MgO, CaO, $Y_2O_3$ and $CeO_2$, and mixtures thereof. These compositions have unique and valuable features, such as, for example, exceptionally homogeneous elemental distribution, both intra- and inter-particle, and a very small primary particle size, averaging less than about 150 nm, and preferably even smaller.

The sub-micron PSZ powders which are obtainable by using a flame reactor according to the teaching of the instant invention are free from the contamination which is associated with prior art processing steps such as calcining and milling. The flame reactor can be operated in a continuous mode which facilitates the production of a homogeneous composition and which avoids the compositional variations experienced with batch processes like those described in the literature. The uniformly fine primary particle size of the flame-produced PSZ is unobtainable by any of the traditional processes.

The uniform equiaxial fine particle size PSZ powders of this invention are particularly useful for fabricating dense high grade ceramic bodies at sintering temperatures, e.g., 1300° to 1550° C., lower than those required when conventional PSZ powders are used. The narrow particle size range and the homogeneous composition make them extremely useful for the preparation of zirconia ceramics where controlled fine grain size and boundary chemistry are critical to performance.

These novel products can be formed by the process of this invention, by the combustion of a homogeneous mixture of a zirconia precursor with a stabilizer precursor, e.g., a homogeneous mixture of $ZrCl_4$ and stabilizer precursor powder in a flame reactor. It is a particular advantage that the process of this invention can be conducted continuously, which is economically superior as compared with traditional batch-wise processes of the prior art. Furthermore, the process of the instant invention provides unique products which are substantially free from impurities.

In the process of this invention, a mixture of powders, e.g., of $ZrCl_4$ and one or more stabilizer precursors, at least one of which powders, preferably, is volatile, are carried in an inert gas, e.g., argon, and fed first into a vaporizer which achieves a temperature sufficient to volatilize the $ZrCl_4$, but not the stabilizer precursor(s). The particular advantages of the powders and the process of this invention are best achieved through the use of zirconia and stabilizer precursors which are substantially pure and of a fine, e.g., −325, mesh, and which are intimately mixed with each other. This is accomplished preferably by feeding the mixture into a conventional powder feeder. These components are then mixed homogeneously with oxygen and an inert gas and fed in a uniform manner into a flame reactor, where they are combusted at temperatures of, e.g., 2000° C., for a very brief period of time, e.g., less than 50 msec. The combustion product is PSZ which is a homogeneous composition of $ZrO_2$ and stabilizer precursor elements.

Without wishing to be bound by any particular theory, it is believed that, as they are combusted, the combustion products are in a liquid state, but particle nucleation occurs rapidly in the high temperature core flame of the flame reactor, and this is followed by particle growth leading to the formation of aerosol primodal droplets. The fine droplets collide and coalesce while they are still at the extremely high temperature of the flame reactor, but as the temperature decreases, they no longer coalesce, but rather begin to stick together forming aggregates. At still lower temperatures, the aggregates form clusters or agglomerates. Aggregates are distinguished from agglomerates in that aggregates are held together by fusion bonds and cannot be fragmented easily, while agglomerates are weakly bonded and can be broken up by high energy agitation, for example, milling.

The reaction is then quenched, e.g., by passing the stream of combustion products into a residence chamber and then into a cooling tube, wherein the temperature of the combustion products is decreased at a controlled rate, such that aggregation and agglomeration result in particles of precisely defined average particle size. The powder produced by this process is then collected, for example, in a bag filter or electrostatic precipitator.

This powder is characterized by being comprised of dense, submicron equiaxial primary particles, which are sintered together to form chains and rings, as well as fused necks connecting the primary particles. The average diameter, i.e., the largest dimension, of the primary particles is in the range of 20–150 nm, preferably 50–150 nm or even smaller. The particles are composed of $ZrO_2$ and stabilizing oxides derived from the stabilizer precursors, such as, for example, MgO, CaO, $Y_2O_3$ $CeO_2$ or mixtures thereof. The amount of stabilizing oxide(s) in the PSZ composition can be from about 1 to about 15 wt %, depending conventionally upon the characteristics of the final ceramic which is desired. Grain, C. F., Phase Relation in the ZrO₂-MgO System, J. A, Cer. Society 50[6] 288-290 (1967) and Miller et al., pp 241 vol 3, Science & Technology of Zirconia (1981).

Suitable zirconia precursors include zirconium compounds which are combustible, e.g., zirconium tetrachloride (ZrCl₄), zirconium acetate, zirconium nitrate and zirconium oxalate. Zirconium tetrachloride is a volatile zirconia precursor, and is preferred. Zirconia precursor powders suitable for use in the process of this invention preferably have a purity of at least 99.5% and a U.S. Standard Sieve classification of −325 mesh.

The term "precursor stabilizers" as used herein means combustible compounds which can be transformed into oxides, during the combustion process of forming the compositions of this invention, into stabilizers. Thus, the precursor stabilizers for the cubic or tetragonal form of zirconia are capable of being converted into oxides by the process of this invention. Suitable precursor stabilizer additives can be selected from the group consisting of, for example, halides, nitrates and acetates of magnesium, calcium, cerium, yttrium and other stabilizing rare-earth metals and mixtures thereof. Preferred stabilizer precursors are, for example, $MgCl_2$, $Mg(NO_3)_2$, $CaCl_2$, $Ca(Ac)^2$, $Y(NO_3)_3$, $YCl_3$ and $CeCl_3$, as well as mixtures of these compounds. Anhydrous powders having a purity of, for example at least 99.5% and a U.S. Standard Sieve classification of −325 mesh are preferred.

The term "primary particles" as used herein means the smallest discernable fully homogeneous units of $ZrO_2$ in the aggregates. In particular, the process of this invention provides primary particles which average less than 150 nm in diameter, and preferably even smaller, in contrast to the generally larger particles produced by the prior art processes. These primary particles are present in the powder product as aggregates of chains and rings of primary particles, which average less than 400 nm.

The term "equiaxial" has its conventional definition. The term "homogeneous" as used herein means the uniform distribution of a stabilizer on an atomic scale in an oxide matrix.

Generally, the amount of stabilizer present in the final powder will be between 1 and 15 wt % stabilizer atoms based on Zr atoms. If mainly the tetragonal form of partially stabilized zirconia is desired, then lower concentration of stabilizer is preferred. If, however, mainly the cubic form is desired, the higher concentrations of stabilizer are preferred.

The determination of the morphology of the PSZ powders can be performed routinely by one of ordinary skill in the art, using, for example, electron microscopy. Primary particle size, aggregate or agglomerates can also be determined routinely, using, for example, electron microscopy, utilizing, e.g., such instrumentation as a Microtrac Analyzer (Micro Paul Corp., Summit, N.J.). The composition of the powders is similarly routinely determined, preferably by X-ray fluorescence spectroscopy. Surface area measurements can be performed using classic nitrogen physiosorption techniques. The crystallographic structure of the powders can be determined by routine X-ray diffraction analysis.

In the process of this invention, the following equation describes the conversion of $ZrCl_4$ to $ZrO_2$:

$$ZrCl_4 + CH_4 + 2O_2 \rightarrow ZrO_2 + 4HCl + CO_2$$

In the above equation, sufficient hydrogen is present to react with all the chlorine to form hydrogen chloride. It is preferred to use less than the stoichiometric requirement of hydrogen, but, to assure adequate oxygen, substantially more than 100% of the stoichiometric requirement of oxygen is supplied to the core flame of the burner.

Sufficient argon or other inert gas should be used to convey the premixed powder to the burner and maintain anhydrous conditions prior to the powder entering the burner to ensure a substantially constant feed rate. The inert gas and the excess of oxygen decrease the flame temperature and consequently, these rates should be optimized, which is routine to one of ordinary skill in the art. The feed rate is characterized by the ratio:

$$\frac{Argon + O_2}{O_2 \text{ theoretical}}$$

The process is preferably conducted with this ratio between 2.5 and 3, and more preferably about 2.8.

Thus, for example, in a typical experiment with a $ZrCl_4$ feed rate of 5 g/min, which is 0.358 mg mol/sec, and a methane rate of 0.358×0.56=20 mg mol/sec, the oxygen rate was 1.2(0.358+0.20)=0.67 mg mol/sec. To convey the powder to the flame, argon was fed at 0.90 mg mol/sec. This corresponded to the ratio:

$$\frac{(0.90 + 0.67)}{(0.358 + 0.20)} = 2.8$$

It is noted that the stabilizer precursor additives are converted to oxides in the combustion zone, but they are present in relatively small amounts; therefore, the excess oxygen which is fed to the combustion zone is more than is required to form the stabilizer oxides.

Other measurements which are useful in optimizing the process conditions of this invention include the following:

(a) The measured distance between the flame nucleation zone (the point at which nucleation of the primary particles begins in the flame reactor) and the point downstream where no further particle growth, aggregation or agglomeration occur is described as the quench distance. It is a function of the temperature and the length of the residence chamber.

Optimization of this reaction is routine to one of ordinary skill in the art utilizing this equation. Thus, in order to use the inert gas one must increase the rate.

(b) The determination of flame loading is important to control. Flame loading is calculated by dividing the weight of $ZrCl_4$ fed to the burner by the volume of the gases delivered to the burner. It is expressed in grams/standard cubic meter.

Optimization of these reactions is routine to one of ordinary skill in the art utilizing these equations.

A preferred embodiment of the process is described in detail below, outlining the process steps as well as suitable types of components for performing the required and desirable functions of the process.

In order to monitor and direct the process, a control panel containing regulators, rotameters and valves to regulate the feed rates of all the gaseous reactants and inert gases can be used. This panel can also be equipped with temperature controllers for the heaters, e.g., electrical resistive heaters, which are used at several points in the process.

ZrCl$_4$ powder and stabilizer precursor powders, screened through a 325 mesh U.S. Standard Sieve, should be mixed until substantially uniform prior to being fed into the vaporizer. This is conveniently done using a dry mixer, for example, a V Blender. The mixture is then charged into a powder feeder, such as, for example, an "Tafa Model 104B" (Thermal Spray Equipment and Supply, Concord, N.H.) screw-auger dry material feeder. The feeder can be mounted above the vaporizer and burner for convenience. Preferably, a means for smoothing the delivery of powder to the vaporizer is attached to the outlet of the feeder; for example, a pneumatic vibrator, TAFA model 104 (Thermal Spray Equipment and Supply, Concord, N.H.) is suitable. Material from the powder feeder is preferably carried through the vaporizer to the burner by a stream of inert gas, e.g., argon, and kept blanketed under such an inert gas to keep it substantially dry (anhydrous).

It is of particular importance that the powder mixture be uniformly mixed and is supplied to the vaporizer unit at a constant flow rate, in order to ensure homogeneity of the final product. Thus it is advantageous from the standpoint of achieving a steady powder throughput in the system that the powder feeder be positioned directly above the vaporizer, which in turn is preferably positioned above the burner.

The vaporizer comprises a means for heating the powder to a temperature of about [350° to 500° C.]. In a preferred embodiment, it comprises a 3.4 m long coil of 5/8" stainless steel tubing heated by a 1200 watt electric furnace. The furnace maintains the temperature high enough to vaporize the ZrCl$_4$ but not the stabilizer precursor(s), e.g., about 450° C. The furnace can be enclosed in a housing of insulating material, e.g., commercially available Transite. The stabilizer precursor(s) are generally not vaporized at this step, but are carried along through the vaporizer as a powder by the other gases.

As the mixture of gases and powder exit the vaporizer, they are further combined with a mixture of methane and oxygen, which are preferably preheated, e.g., to about 120° C. This step can be performed by a suitable mixer, e.g., a static mixer. In the preferred embodiment, the static mixer comprises five helical stainless steel sections alternating in direction. The mixture of gases and powder are then conveyed in the inert gas carrier stream to the burner.

It is an important aspect of this process that the combustion of the gases and stabilizer precursors be carried out by a means wherein the temperature of the process and timing of the combustion is very carefully controlled. A preferred embodiment for performing this process comprises a stainless steel burner, comprising a core flame which can achieve temperatures of above 1500° C., preferably about 2000° C. The apparatus preferably allows for carefully controlled residence times within the core flame, preferably about 50 msec, when the flame is at about 2000° C. Other suitable residence times can be routinely determined for other core flame temperatures by one of ordinary skill in the art.

It is preferred that the core flame be surrounded by a means of preventing the burner from fouling by keeping the core flame from contacting the burner surfaces; in a preferred embodiment, a propane/air guard flame was employed. In this embodiment, the guard flame jet was fitted with a porous stainless steel flame distributor made out of 40 micron sintered stainless steel. The entire burner assembly is preferably enclosed in a heated protective device to prevent condensation of ZrCl$_4$ vapors; e.g., in the preferred embodiment, a quartz tube extending three to four times the length of the core flame, which tube is heated to about 330° C. by a platinum wound furnace was used. It is also preferred that the air and propane feeds to the burner be preheated, e.g., to about 120° C.

After combustion in the burner flame, the combustion products are cooled (quenched) in a controlled process, for example, in a residence chamber/furnace. In a preferred embodiment, this apparatus consists of a quartz glass tube, through which the combustion products can be observed, which is connected via a graphite coupling to a 99 cm long alumina tube (4.2 cm ID×4.8 cm OD), which passes through a vertical tube furnace, e.g., a Parr Scientific Model 16E. The furnace has an overall length of 95 cm and its heated zone was 45 cm long. The furnace was maintained at 1500° C. throughout the period of residence of the combustion products, which was approximately 100 to 200 msec.

The powder produced by the above-described process is then collected by a collecting means, such as, for example, an electrostatic precipitator or a bag filter. This means can be routinely selected by one of ordinary skill in the art as a matter of convenience. In a preferred embodiment, the PSZ powder produced as described above, suspended in the stream of carrier and combustion gases emerging from the alumina tube below the furnace, was pulled via a vacuum, along with ambient air (quench) into a 1" ID Pyrex line running to a bag filter, manufactured by Mikro-Pul Corporation. The ZrO$_2$/stabilizer powder was collected in the bag filter, which can consist of, e.g., seven Teflon felt bags, having a total area of 1.9 m$^2$. The bag filter was maintained at a suitable temperature, e.g., 105°–125° C., in order to prevent condensation of the combustion products. Blow pipes can be fitted in proximity to the bag filters to fire bursts of compressed air in order to knock powder loose from the bags, and can be activated at intervals of, e.g., 5 min.

Alternatively, the PSZ powder in the stream of combustion and carrier gases can be drawn through an electrostatic precipitator. This apparatus can consist, e.g., of a 60 cm long aluminum tube, 8.25 cm ID, with a 3.18 mm nickel rod running down the center. The tube is then grounded, and the rod connected to the negative output form a 30 kV DC power supply, e.g., a Hypotronics Model R30B. The ZrO$_2$/stabilizer powder was collected at the bottom of the precipitator and periodically removed.

The gases which are pulled from the residence chamber outlet and through the bag filter or the electrostatic precipitator contain toxic gases which require scrubbing before they can be vented to the atmosphere. This can be accomplished by a number of means known to one of ordinary skill in the art. For example, in the preferred embodiment, the vacuum to pull these gases and powder was provided by a Venturi type ejector, e.g., an Artisan Jet-vac Model W-10 (Artisan Industries, Waltham, Mass.), through which a caustic solution, maintained at pH 10, was pumped at the rate of 40 gpm. This system thus served as a fume scrubber, as the caustic soda absorbed the chlorine and hydrogen chloride in the gas stream prior to discharging it to the atmosphere.

The caustic solution was contained in a 410 liter tank, and was continuously recycled.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application(s), are hereby incorporated by reference.

EXAMPLE 1

This example describes the preparation of partially stabilized zirconia (PSZ) powder, containing 3.2 wt % of magnesium oxide, by flame combustion of a vaporized mixture of zirconium chloride and magnesium chloride.

A dry mixture of 96 wt. % $ZrCl_4$ (Johnson Matthey/Aesar, 325 mesh) and 4 wt. % $MgCl_2$ (Aldrich Chemical, micronized to $-325$ mesh) was charged to a TAFA Model 104 vibratory powder feeder. The powder feeder was initially purged with dry argon to remove any traces of moisture and a flow of 2800 Std.cc/min. of argon was used to convey the powder into a vaporizer at a feed rate of about 5 g/min. The vaporizer consisted of a 4.76 mm ID, 100 cm long 316 stainless steel tube which was heated by an electric furnace to a temperature of 450° C. Vaporized $ZrCl_4$ and $MgCl_2$ powder in the argon stream leaving the vaporizer were mixed with methane 240 Std.cc/min. and oxygen 1000 Std.cc/min. This corresponded to a molar ratio: argon to oxygen and a 20% excess of oxygen over the stoichiometric requirement.

The mixed stream entered the burner where it was combusted reaching an estimated core flame temperature of 1970° C.

The face of the burner had a circular groove having an O-ring seal, into which was fitted the end of a quartz tube, 40 mm ID and 7.6 cm long. The quartz tube was connected via a graphite coupling, 2.5 cm long, to a mullite tube, 42 mm ID, 48 mm OD, 61 cm long. The mullite tube was heated by a platinum wound furnace to 1500° C. The core flame was maintained in the middle of the quartz tube by a thin annular mantle of argon which flowed between it and a propane/oxygen guard flame. The guard flame jet was fitted with a porous stainless steel flame distributor. The core flame loading was 560 g of the $ZrCl_4/MgCl_2$ mixture per standard cubic meter.

The combusted gases passed through the mullite tube residence chamber which was heated to 1500° C. The gases cooled on leaving the residence chamber and the quench distance was 71 cm, corresponding to a total growth time of about 236 milliseconds in the core flame and the residence chamber.

Particulate material was cooled in an electrostatic precipitator which consisted of a 60 cm aluminum tube, 8.25 cm ID with a 3.18 mm nickel rod running down the center. The tube was grounded and the rod connected to the negative output from a 30 kV DC powder supply, (Hypotronics, Model R308). The exhaust gases were passed through a scrubbing tower containing water to remove by-product chlorine and hydrogen chloride. The effluent gases were then steam treated in a graphite lined jet ejector, (Artisan Industries, Jet-Vac, Model W-10), and discharged to the atmosphere.

10 g of a white free flowing powder were recovered from the collector, during a 10 minute interval. This powder was found by X-ray spectrographic analysis to contain 3.2% MgO. X-ray diffraction analysis showed it to be primarily tetragonal $ZrO_2$ containing only a trace of monoclinic phase and a possible trace of cubic phase. The surface area by nitrogen absorption was 17.2 $m^2/g$.

Electronic microscopy showed the powder consisted of aggregates, in the form of rings and chains, of dense essentially spherical primary particles within the size range of 25 to 60 nanometers. The average diameter of the primary particles was estimated to be 35 nanometers.

EXAMPLE 2-9

The procedure described in Example 1 was used to prepare PSZ powders containing various stabilizing oxides and mixtures of oxides. The amount of stabilizer in the PSZ powders ranged from 1.4 to 12.6 wt % based on the $ZrO_2$. At the lower levels of stabilizer, 5 wt % or less, with mono, binary or ternary mixtures of oxides, the major crystalline phase obtained was tetragonal. Above 5 wt % stabilizer the cubic phase was the predominant species.

The process conditions and product characterization information are given in Table 1 below.

TABLE 1

| | Wt. Ex. No. | | | | | | | |
|---|---|---|---|---|---|---|---|---|
| | 2 | 3 | 4 | 5(b) | 6(b) | 7 | 8 | 9 |
| | 14-5 | 24-4 | 24-8 | 141-5 | 141-19 | 64-1 | 70-1 | 76-1 |
| | | | PROCESS CONDITIONS | | | | | |
| Stabilizer Precursor | $MgCl_2$ | $CeCl_3$ | $Y(NO_3)_3$ | $MgCl_2$ | $Y(NO_3)_3$ | $MgCl_2$ $Y(NO_3)_3$ | $Y(NO_3)_3$ $CeCl_3$ | $MgCl_2$ $Y(NO_3)_3$ $CeCl_3$ |
| % Based on $ZrCl_4$ | 4 | 6 | 6 | 10 | 15 | 3 + 3 | 3 + 3 | 2 + 2 + 2 |
| 4 mA + 024 m 4 m 224 m | 2.8 | 2.8 | 2.8 | 1.7 | 1.7 | 2.8 | 2.6 | 2.4 |
| % Theoretical $O_2$ | 120 | 120 | 120 | 73 | 73 | 120 | 112 | 90 |
| Flame Temp °C. | 2030 | 2030 | 2030 | 2030 | 2030 | 2030 | 2050 | 2000 |
| Furnace Temp °C. | 1500 | 1500 | 1500 | 1550 | 1500 | 1500 | 1500 | 1500 |
| Flame Loading g/std. $m^3$ | 630 | 630 | 530 | 1260 | 1260 | 630 | 705 | 945 |
| Quench Distance cm | 66 | 66 | 66 | 103 | 103 | 66 | 66 | 66 |
| Growth Time | 236 | 236 | 236 | 368 | 368 | 236 | 236 | 236 |

TABLE 1-continued

| | Wt. Ex. No. | | | | | | | |
|---|---|---|---|---|---|---|---|---|
| | 2<br>14-5 | 3<br>24-4 | 4<br>24-8 | 5(b)<br>141-5 | 6(b)<br>141-19 | 7<br>64-1 | 8<br>70-1 | 9<br>76-1 |
| Millisecs (Flame + Furnace) | | | | | | | | |
| | | | PRODUCT CHARACTERIZATION | | | | | |
| Collected g | 36.4 | 31 | 20.2 | 90.0 | 82.5 | 28.8 | 25.7 | 32.2 |
| Stabilizer | MgO | CeO$_2$ | Y$_2$O$_3$ | MgO | Y$_2$O$_3$ | MgO<br>Y$_2$O$_3$ | Y$_2$O$_3$<br>CeO$_2$ | MgO<br>Y$_2$O$_3$<br>CeO$_2$ |
| Wt % Based on ZrO$_2$(a) | 3.2 | 4.5 | 3.1 | 5.4 | 12.8 | 1.1 + 0.75 | 1.07 + 0.34 | 0.6 + 0.8 + 0.4 |
| S.A. m$^2$/g | 15.5 | 14.7 | 12.0 | 10.4 | 9.2 | 13.0 | 16.6 | 12.6 |
| ZrO$_2$ Crystal Phase | | | | | | | | |
| Major | Tetrag. | Tetrag. & Monoclinic | Tetrag. & Monoclinic | Cubic | Cubic | Tetrag. | Tetrag. | Tetrag. |
| Minor | Monoclinic | ND* | ND | ND | Monoclinic | ND | ND | Monoclinic |
| Trace | ND | ND | ND | ND | Tetrag. | Monoclinic | ND | ND |

*ND means none detected

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. A partially stabilized zirconia powder, comprising aggregates of dense equiaxial primary particles, wherein said particles have an average diameter of less than about 150 nm and comprise zirconia and a homogeneously distributed stabilizer.

2. A zirconia powder of claim 1, wherein the particles have an average diameter of less than about 50 nm.

3. A zirconia powder of claim 1, wherein the zirconia is primarily cubic.

4. A zirconia powder of claim 3, wherein the concentration of stabilizer is about 7 to 15 wt % of the total powder.

5. A zirconia powder of claim 1, wherein the zirconia is primarily tetragonal.

6. A zirconia powder of claim 5, wherein the concentration of stabilizer is about 1 to 7 wt % of the total powder.

7. A zirconia powder of claim 1, wherein the stabilizer precursor powder is a halide, nitrate or acetate of magnesium, calcium, cerium, or yttrium or a mixture thereof.

8. A method of preparing a partially stabilized zirconia powder, said powder comprising aggregates of dense equiaxial primary particles, wherein said particles have an average diameter of less than about 150 nm and comprise zirconia and homogeneously distributed stabilizer, comprising combusting a homogeneous mixture of (a) a combustible zirconia precursor and (b) a one or more combustible stabilizer precursors.

9. A method according to claim 8 wherein the combustion step occurs in a flame reactor.

10. A method according to claim 8, wherein (a) and (b) are fed to a vaporizer by a powder feeder.

11. A method according to claim 10, wherein at least one of (a) and (b) is vaporized in said vaporizer prior to combustion.

12. A method according to claim 11 wherein the combustion step occurs in a flame reactor.

13. A method according to claim 9 or claim 12, wherein the combustion products are quenched in a controlled fashion.

14. A method according to claim 8 or claim 9 or claim 12, wherein the combustion occurs at temperatures of about 1400° to 2500° C.

15. A method of preparing a partially stabilized zirconia powder, said powder comprising aggregates of dense equiaxial primary particles, wherein said particles have an average diameter of less than about 150 nm and comprise zirconia and homogeneously distributed stabilizer, comprising a) intimately mixing ZrCl$_4$ powder with a stabilizer precursor powder or a combination of stabilizer precursor powders;

b) powder feeding said powder mixture with an inert gas into a vaporizer at a controlled rate;

c) vaporizing the volatile components of the powder mixture;

d) combusting in a flame reactor the components from step c) conveyed to the flame reactor uniformly in an inert gas, a combustible hydrocarbon gas and oxygen;

e) quenching the combustion reaction; and f) recovering partially stabilized zirconia powder.

16. A method of claim 15, wherein the stabilizer precursor powder is a halide, nitrate or acetate of magnesium, calcium, cerium, or yttrium or a mixture thereof.

17. A method of claim 15, wherein the vaporization temperature is 350° to 600° C.

18. A method of claim 15, wherein the combustion temperature is 1400° to 2500° C.

19. A method of claim 15, wherein the combustion time is 10 to 200 msec.

20. A method of claim 15, wherein the quenching temperature is 1400° to 100° C.

21. A method of claim 15, further comprising a step of maintaining the combustion products immediately after combustion at a temperature of 1200° to 2000° C. for 10 to 500 msec.

22. A partially stabilized cubic or tetragonal zirconia powder, comprising aggregates of dense equiaxial primary particles, wherein said particles have an average diameter of less than about 150 nm and comprise zirconia and a homogeneously distributed stabilizer, produced by a method according to claim 8 or claim 15.

* * * * *